May 5, 1936.  M. SMITH  2,039,667
RACK OR BODY FOR WAGONS AND TRUCKS
Filed June 26, 1935 2 Sheets-Sheet 1
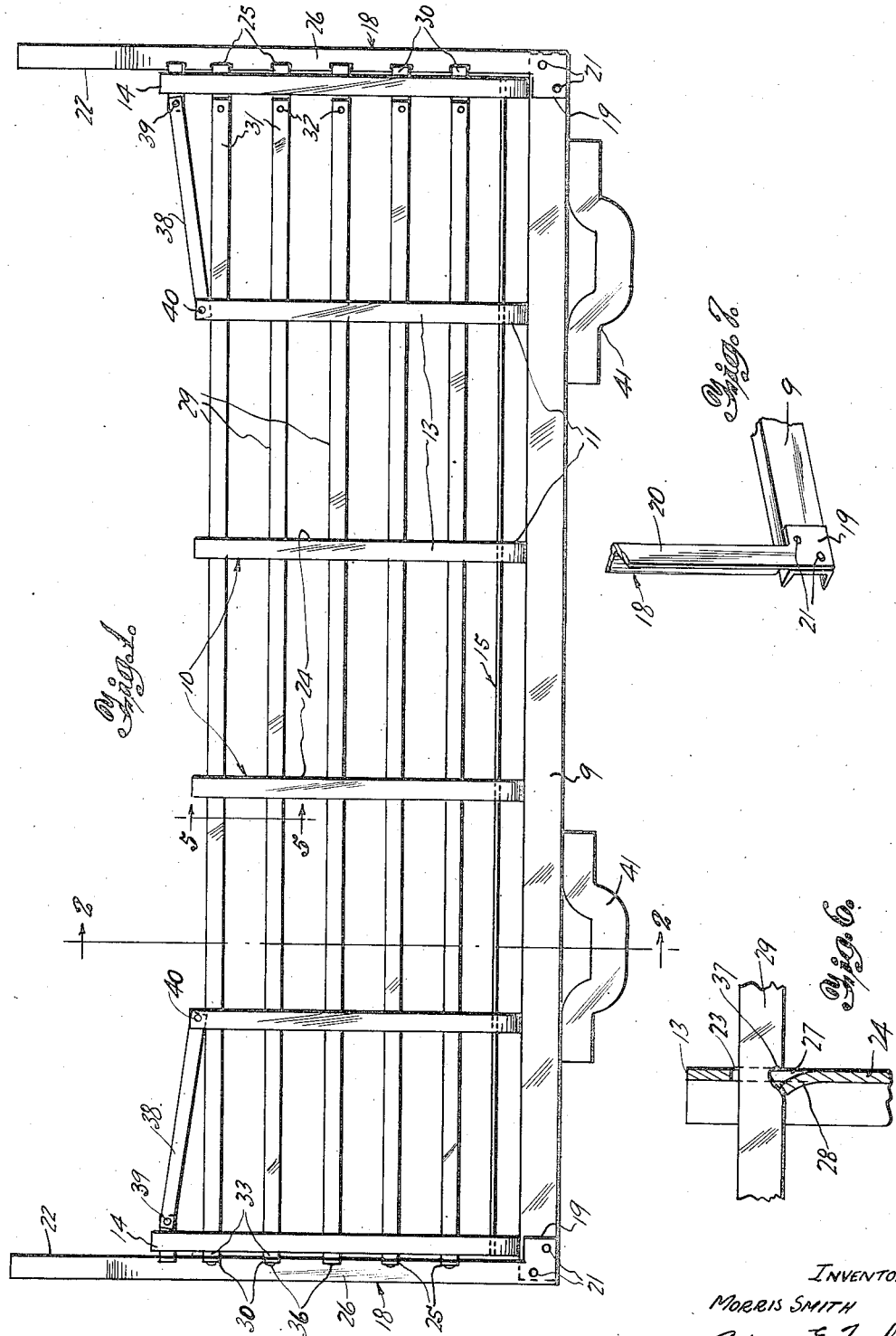
INVENTOR
MORRIS SMITH
By Adam E. Fisher
ATTORNEY May 5, 1936.                M. SMITH                2,039,667
             RACK OR BODY FOR WAGONS AND TRUCKS
                Filed June 26, 1935          2 Sheets-Sheet 2
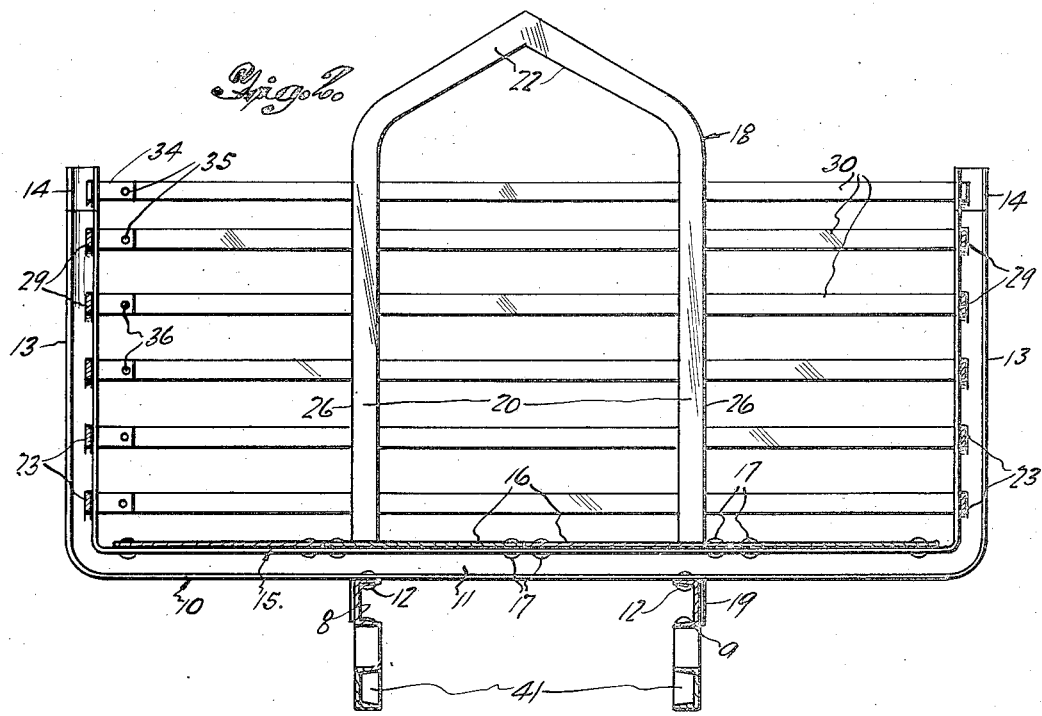
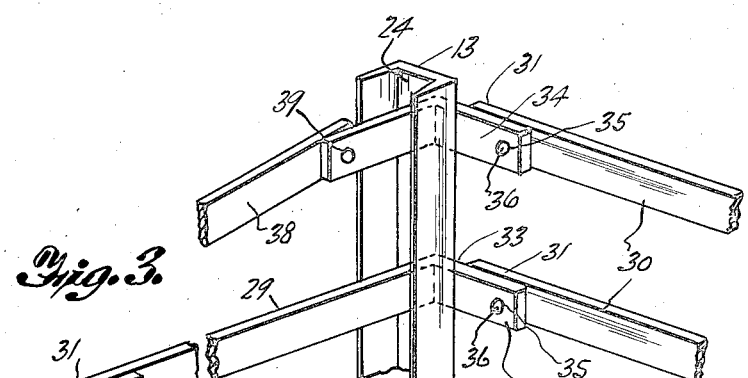
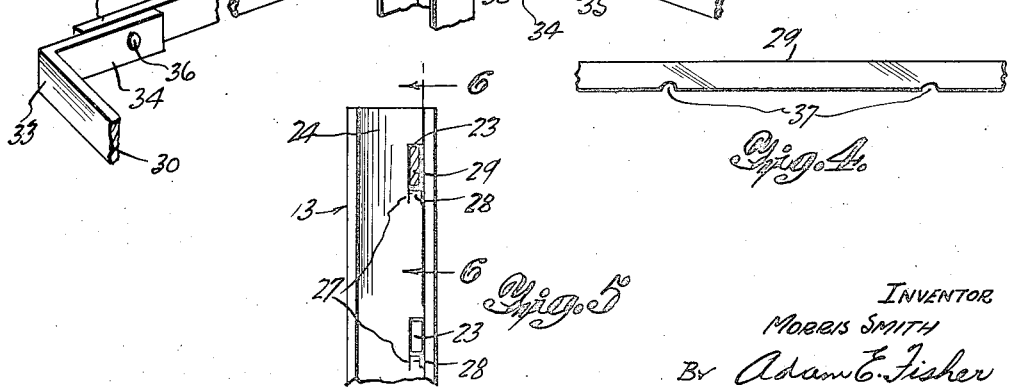

Patented May 5, 1936

2,039,667

UNITED STATES PATENT OFFICE 2,039,667

RACK OR BODY FOR WAGONS AND TRUCKS

Morris Smith, Chester, Mont.

Application June 26, 1935, Serial No. 28,442

2 Claims. (Cl. 296—3)

My invention relates generally to improvements in racks or bodies for wagons and trucks and the main object is to provide an assembly of this kind made up of a number of complementary parts which may be packed and shipped knocked down and assembled readily by the purchaser or intended user to form a hay rack, stock rack or similar body for a wagon or truck.

Another object is to provide an assembly of this kind in a simple, inexpensive and readily assembled form comprising a pair of main sills or beams having means for mounting on the wagon or truck chassis, a plurality of substantially U-shaped cross beams or yokes adapted to be secured in spaced relation crosswise along the sills, a pair of inverted U-shaped end beams or frames adapted to be secured at the ends of the sills, a plurality of elongated strips adapted to be secured along the upturned ends of the cross and end beams to form the ends and sides of the rack, and a sectional bottom of wood or sheet metal adapted to be secured to the horizontal portions of the cross beams to form the floor of the rack.

Another object is to provide novel, simple and conveniently manipulated means for fastening the said strips in place both at their ends and intermediate their ends to their supporting beams.

With these and other objects in view the invention resides in the novel construction and arrangement of parts as hereinafter fully set forth and claimed, reference being had to the accompanying drawings wherein:

Figure 1 is a side view of an assembled hay rack made up in accordance with my invention.

Figure 2 is a cross section along the line 2—2 in Figure 1.

Figure 3 is an enlarged fragmental perspective view of one corner of the rack showing the connections of the side and end strips.

Figure 4 is a fragmental elevation of a medial portion of one side strip.

Figure 5 is an enlarged fragmental cross section through one side of the rack taken along the line 5—5 in Figure 1.

Figure 6 is a section along the line 6—6 in Figure 5.

Figure 7 is a fragmental perspective view of one end of one sill showing the mounting of the end frame thereon.

In the specific exemplification of my invention as a hay rack shown in the drawings the reference numerals 8 and 9 designate a pair of elongated main sills conveniently and inexpensively formed of channel iron and adapted when assembled to be set up in spaced parallel relation as shown forming the supporting means for the whole rack. It is understood that these sills 8 and 9 as well as all other parts to be described are originally packed and shipped flat or knocked down so as to reduce storage, packing and shipping expenses and only the assembly of these parts will be herein described.

The sills 8 and 9 are held in the aforesaid spaced relation by U-shaped cross beams 10 set up along the length of the sills and secured thereto by their horizontal portions or bights 11 as shown. The fasteners 12 by which these beams 10 are mounted as well as all the fasteners to be hereinafter described may be rivets, screws or bolts as found most suitable in practice but are shown as being rivets. The cross beams 10 are also formed of channel iron and include in addition to the aforesaid bights 11 the spaced upstanding legs or arms 13 set out some distance from the sills 8 and 9 by their relatively elongated bights and which may diverge upwardly if desired or be exactly parallel as shown whichever is desired. The beams 10 nearest the ends of the sills are set back slightly from the ends of the sills as shown and their arms 13 are slightly longer than are the arms of the intermediate beams as designated at 14.

The floor 15 of the rack is made up as shown of a plurality of long sheets 16 of sheet metal secured by fasteners 17 to the horizontal bights 11 of the beams 10 and covering all of the space within the arms 13.

Inverted substantially U-shaped angle-iron formed end beams or frames 18 are mounted at the ends of the racks by folding back one web 19 of the lower ends of each leg 20 of these beams to lie flat alongside the exposed ends of the sills 8 and 9 just outside the endmost cross beam 10 and securing these webs to the sills by fasteners 21. The legs 20 are of course the same distance apart as the sills 8 and 9 and the bights 22 of the beams 18 are disposed uppermost some distance above the level of the beams 10.

The upstanding arms 13 of the cross beams 10 have each a plurality of evenly spaced slots 23 in their connecting webs 24 which lie at right angles to the sides of the rack while the legs 20 of the end beams 18 have similar slots 25 in the webs 26 at right angles to the end lines of the rack as a whole, the slots 23 and 25 being all formed in horizontal alignment as shown. The under sides or margins of the slots 23 and 25 are cut out downwardly as shown at 27 to form locking tongues 28 for a purpose to be described.

A plurality of elongated side strips or rails 29 and shorter end strips or rails 30 are provided in numbers equal to the number of vertically spaced slots in one cross beam 10 and one end beam 18 and each strip 29 and 30 has one straight end 31 with an adjacent aperture 32 and one end 33 bent at right angle to form a short connecting end or finger 34 having an aperture 35. In use the side strips 29 are inserted endwise straight ends first through the slots 23 and the end strips 30 are similarly inserted through the slots 25. The arrangment is then such that the straight ends 31 of the strips on each side and end are disposed alongside the right angularly turned fingers 34 of the adjacent strips and the strips are then all connected by fasteners 36 through the then aligned apertures 32 and 35. The sides and ends of the rack are then inclosed by the upstanding framework of beams and strips described.

Each of the strips 29 and 30 have a plurality of notches 37 in their intended lower edges spaced apart so as to register with the slots 23 and 25 and the aforesaid tongues 28 being initially bent outward or to one side (Figure 6) may then be hammered back to upright position into engagement with the notches 37 whereby the strips 29 and 30 are all held against longitudinal displacement through the slots.

Short brace bars or strips 38 are secured at 39 to the extended upper ends 14 of the end cross beams 10 and extend angularly inward to the upper ends of the adjacent inner beams where they are secured at 40 as shown.

It will be readily evident from the foregoing that the assembly and construction of a hay rack from these parts is straightforward and readily carried out and forms a rigid, durable and inexpensive rack when completed. The sills 8 and 9 may carry any suitable means for mounting on the wagon trucks or truck chassis as for instance the wagon bolsters 41 shown.

For a stock rack the floor 15 would preferably be made of wood and doors be arranged between the legs 20 of the end beams 18 and of course the size may be varied at will to fit a truck, wagon or trailer.

While I have herein set forth a certain preferred embodiment of my invention, it is understood that I may vary from the same in minor structural details, so as best to construct a practical device for the purpose intended, not departing from the spirit of the invention and within the scope of the appended claims.

I claim:

1. In a device of the kind described, a pair of parallel beams, a plurality of U-shaped cross beams secured by their bights in crosswise position upon the beams at spaced points, a sectional floor built up on the bights of the cross beams, a pair of inverted U-shaped end beams including legs secured at their lower ends to the ends of the sills, the said legs of the end beams and the upstanding arms of the cross beams all having spaced aligned notches, a plurality of elongated side and end strips each having a straight end and an end with a finger turned at right angles, the said strips being inserted lengthwise straight ends first into the said slots, whereby the straight ends fall alongside the said fingers and are secured thereto at the corners of the rack.

2. In a device of the kind described, a pair of parallel beams, a plurality of U-shaped cross beams secured by their bights in crosswise position upon the beams at spaced points, a sectional floor built up on the bights of the cross beams, a pair of inverted U-shaped end beams including legs secured at their lower ends to the ends of the sills, the said legs of the end beams and the upstanding arms of the cross beams all having spaced aligned notches, a plurality of elongated side and end strips each having a straight end and an end with a finger turned at right angles, the said strips being inserted lengthwise straight ends first into the said slots, whereby the straight ends fall alongside the said fingers and are secured thereto at the corners of the rack, the said strips having notches in their undersides spaced apart to register with the said slots, and locking tongues formed at the lower margins of the said slots to engage the notches and lock the strips against axial displacement through the slots.

MORRIS SMITH.